(12) United States Patent
Gronning

(10) Patent No.: US 9,890,841 B2
(45) Date of Patent: Feb. 13, 2018

(54) ROD ROTATOR

(71) Applicant: GLOBAL OIL AND GAS SUPPLIES INC., Beaumont (CA)

(72) Inventor: David Gronning, Beaumont (CA)

(73) Assignee: GLOBAL OIL AND GAS SUPPLIES INC., Beaumont (CA)

( * ) Notice: Subject to any disclaimer, the term of this patent is extended or adjusted under 35 U.S.C. 154(b) by 0 days.

(21) Appl. No.: 15/419,415

(22) Filed: Jan. 30, 2017

(65) Prior Publication Data
US 2017/0219073 A1  Aug. 3, 2017

Related U.S. Application Data

(60) Provisional application No. 62/288,772, filed on Jan. 29, 2016.

(51) Int. Cl.
*F16H 29/02* (2006.01)
*E21B 19/00* (2006.01)
*E21B 37/02* (2006.01)
*E21B 43/12* (2006.01)

(52) U.S. Cl.
CPC ............. *F16H 29/02* (2013.01); *E21B 19/00* (2013.01); *E21B 37/02* (2013.01); *E21B 43/127* (2013.01)

(58) Field of Classification Search
CPC ........... E21B 37/02; E21B 19/00; F16H 29/02
See application file for complete search history.

(56) References Cited

U.S. PATENT DOCUMENTS

| | | | | |
|---|---|---|---|---|
| 2,630,181 | A * | 3/1953 | Solum | E21B 19/00 166/78.1 |
| 2,678,696 | A * | 5/1954 | Crake | E21B 33/072 151/104.05 |
| 4,182,203 | A * | 1/1980 | Drury | F16H 29/04 74/30 |
| 5,429,188 | A * | 7/1995 | Cameron | E21B 33/0415 166/117.7 |

* cited by examiner

*Primary Examiner* — Terence Boes
(74) *Attorney, Agent, or Firm* — Bennett Jones LLP

(57) ABSTRACT

A rod rotator has a crankshaft with non-aligned crank journals, a first actuating pawl attached to the first crank journal and a second actuating pawl attached to the second crank journal, and a ratchet wheel connected to a polished rod. The first actuating pawl pushes on the ratchet wheel to rotate the ratchet wheel while the second actuating pawl pulls on the ratchet wheel to rotate the ratchet wheel at the same time.

8 Claims, 7 Drawing Sheets

ROD ROTATOR

FIELD OF THE INVENTION

The present invention relates to a rod rotator for use with a reciprocating rod pumpjack.

BACKGROUND OF THE INVENTION

The production of oil with a reciprocating sucker-rod pump is common practice in the oil and gas industry. A string of steel rods, commonly referred to as sucker rods, extend within tubing down into the pump for operating the pump. The sucker rods may be reciprocated with a pumpjack, also known as a horsehead or walking beam pump.

It is known to rotate the sucker rods in an effort to more evenly distribute wear on the rod couplings and tubing. Rotation of the sucker rods may also be used to scrape paraffin from within the tubing with scrapers, in an effort to prevent objectionable deposits of paraffin from restricting flow of oil to the surface.

SUMMARY OF THE INVENTION

In one aspect, the present invention provides a rod rotator comprising dual actuator arms which push and pull a ratchet wheel to rotate the ratchet wheel, thereby rotating any tubulars attached to the ratchet wheel.

BRIEF DESCRIPTION OF THE DRAWINGS

The invention will now be described by way of an exemplary embodiment with reference to the accompanying simplified, diagrammatic, not-to-scale drawings. Any dimensions provided in the drawings are provided only for illustrative purposes, and do not limit the invention as defined by the claims. In the drawings:

DETAILED DESCRIPTION OF THE INVENTION

The present invention provides a rod rotating device for use with a reciprocating rod pumps. When describing the present invention, all terms not defined herein have their common art-recognized meanings. To the extent that the following description is of a specific embodiment or a particular use of the invention, it is intended to be illustrative only, and not limiting of the claimed invention. The following description is intended to cover all alternatives, modifications and equivalents that are included in the scope of the invention, as defined in the appended claims.

Figure 1:
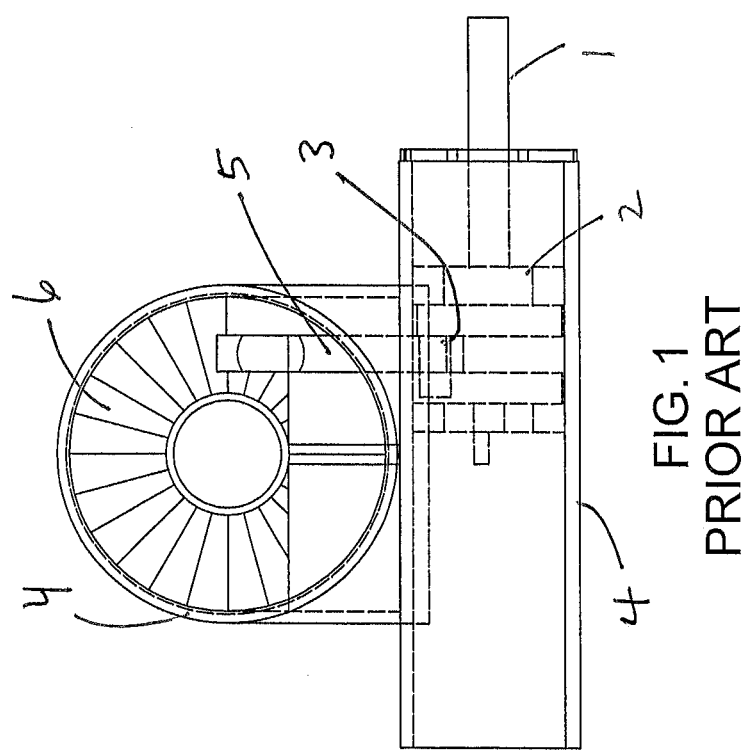
FIG. 1 is a top view of a cut-away of a prior art rod rotator.

A prior art rod rotator is shown in FIG. 1. Rotation of a shaft (1) causes rotation of a crankshaft (2) with an offset crank journal (3) within a housing (4). The crank journal converts rotational movement to a reciprocating movement. The crank journal causes reciprocation of a pawl (5), which unidirectionally rotates a ratchet wheel (6). The ratchet wheel is attached to a polished rod (not shown) which passes through the centre of the ratchet wheel.

Figure 2:
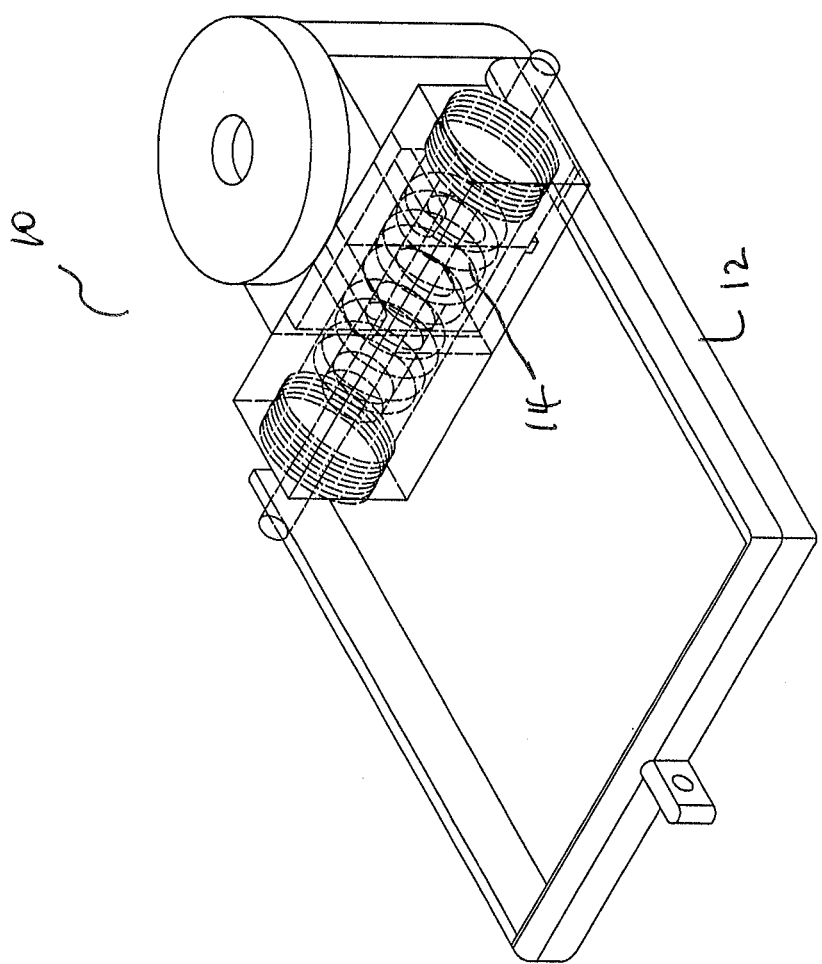
FIG. 2 is a pictorial view of one embodiment of a rod rotator of the present invention.
Figure 3:
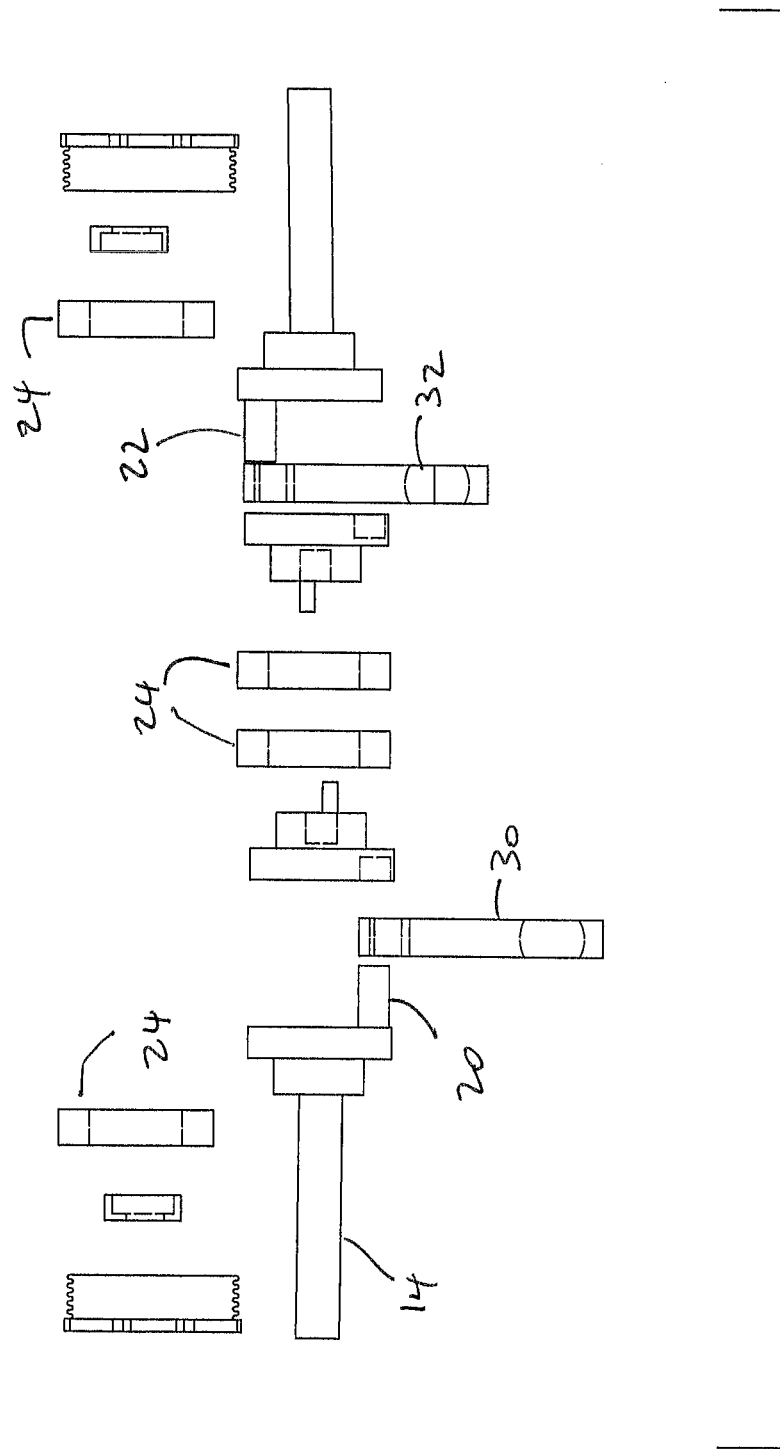
FIG. 3 is an exploded view of the components of a crankshaft assembly.
Figure 4:
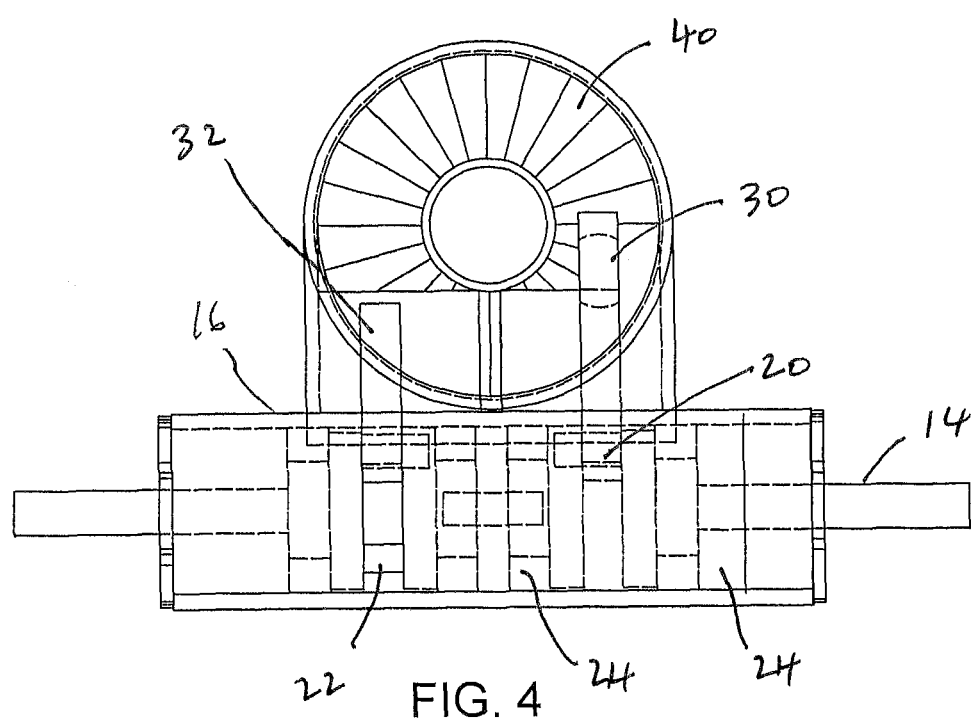
FIG. 4 is a partial cut-away top view of the embodiment of FIG. 2.
Figure 5:
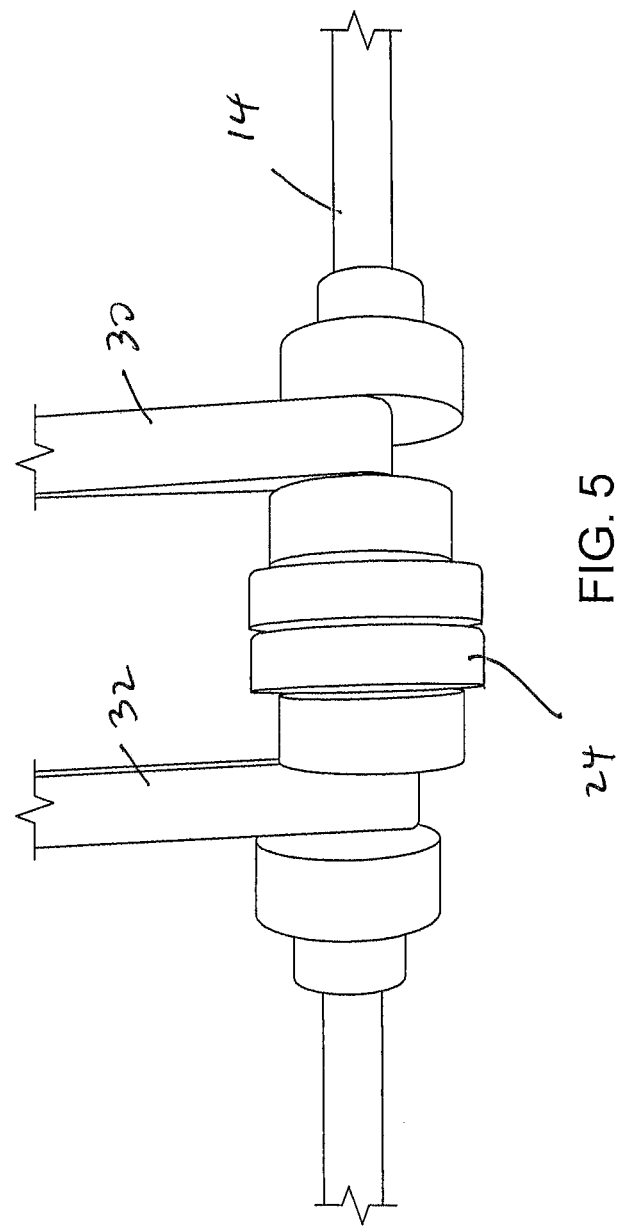
FIG. 5 is a pictorial view of the assembled crankshaft assembly of FIG. 3.
Figure 6:
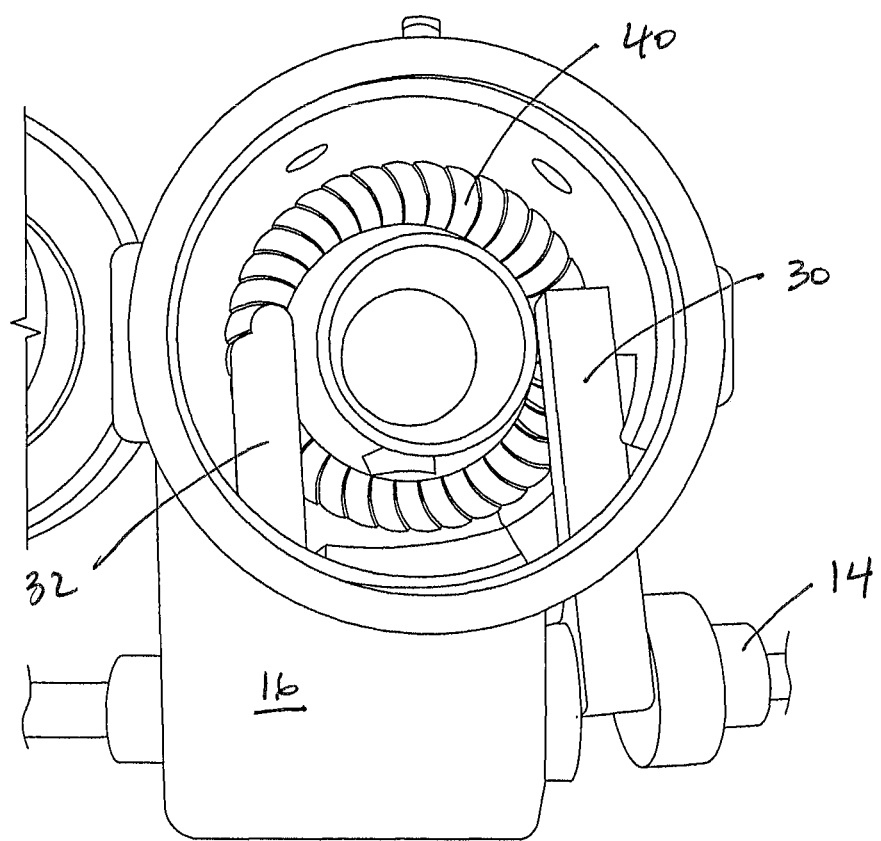
FIG. 6 is a partial cut-away top view of the embodiment of FIG. 2.
Figure 7:
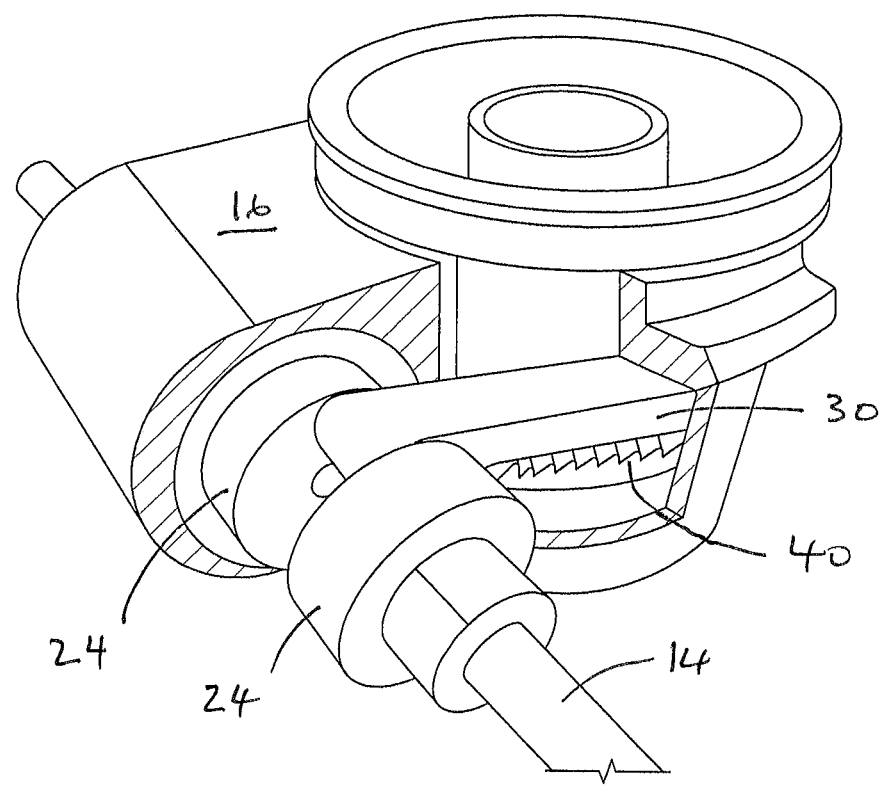
FIG. 7 is a perspective view of the embodiment of FIG. 2.

Like conventional prior art rod rotators, the rod rotator of the present invention may rotate a sucker rod utilizing the energy of the reciprocating pump to rotate the rod. The rod rotator (10) is mounted to a polished rod (not shown) in a conventional manner above the well head. Vertical reciprocating linear movement of the pumpjack is translated into a rotational movement along a horizontal axis by a lever arm (12), which rotates a crankshaft (14). The crankshaft (14) converts rotational movement into a horizontal reciprocating movement to rotate the polished rod, which causes rotation of the sucker rod string. In a preferred embodiment, the lever arm (12) may be U-shaped and attached to both ends of the crankshaft (14) as shown in FIG. 2, or in a simpler embodiment, may be a single arm attached to one end of the crankshaft.

As is well known in the art, the rod rotator (10) may be affixed to the polished rod so as to vertically reciprocate with the polished rod. In this case, a cable may be affixed to a stationary object, such as a ground anchor, in order to actuate the lever (12). In alternative embodiments, different means to rotate the crankshaft may be provided, such as an electric or hydraulic motor connected to a flexible drive shaft.

The crankshaft (14) is disposed within a housing (16) which has a first portion enclosing and supporting the crankshaft. The crankshaft may comprise an assembly comprising a first crank journal (20) and second crank journal (22) and at least one bearing assembly (24), and preferably a plurality of bearing assemblies (24). Alternatively, the crankshaft may be a single element made of one piece, which is supported at least at both ends with bearing assemblies an preferably between the two crank journals. The crank journals (20, 22) are not aligned, and in one embodiment are oppositely disposed on the crankshaft, when viewed along the longitudinal axis of the crankshaft. One skilled in the art will understand that the reciprocating motion caused by two crank journals which are oppositely disposed will be 180° out of phase.

Accordingly, the rod rotator (10) comprises first and second actuator pawls (30, 32) attached to the first and second crank journals (20, 22), which simultaneously rotate a ratchet wheel (40), thereby rotating any tubulars attached to the ratchet wheel. The first actuating pawl (30) is connected to the first crank journal (20), while the second actuating pawl (32) is connected to the second crank journal (22). The first actuating pawl (30) is adapted to pull the ratchet wheel (40) as it is drawn towards the crankshaft. The second actuating pawl (32) is adapted to push the ratchet wheel (40) as it is extends away from the crankshaft. If the first crank journal and the second crank journal are oppositely disposed on the crankshaft, the pushing and pulling motions of the first and second actuating pawls (30, 32) are synchronized to rotate the ratchet wheel.

In the embodiment shown, the ratchet wheel (40) teeth are disposed on an upper surface of the ratchet wheel. In an alternative embodiment, the ratchet wheel teeth may be disposed around the periphery of the wheel, and the first and second pawls configured accordingly.

What is claimed is:

1. A rod rotator comprising:
   a. a crankshaft having a first crank journal and a second crank journal, wherein the first and second crank journals are not aligned;

b. a first actuating pawl attached to the first crank journal and a second actuating pawl attached to the second crank journal;

c. a ratchet wheel connected to a polished rod;

d. wherein the first actuating pawl pushes on the ratchet wheel to rotate the ratchet wheel and wherein the second actuating pawl pulls on the ratchet wheel to rotate the ratchet wheel.

2. The rod rotator of claim 1 wherein the first crank journal and the second crank journal are 180° out of phase.

3. The rod rotator of claim 1 wherein the first pawl pushes and the second pawl pulls at the same time.

4. The rod rotator of claim 1 wherein the crankshaft is rotated by a lever arm.

5. The rod rotator of claim 4 wherein the lever arm is U-shaped, comprising two lever arms, each connected to opposing ends of the actuating shaft.

6. The rod rotator of claim 1 wherein the ratchet wheel comprises teeth on an upper surface of the wheel.

7. The rod rotator of claim 1 wherein the crankshaft is supported by a bearing assembly between the first and second crank journals.

8. The rod rotator of claim 1 wherein the crankshaft is made of one piece.

\* \* \* \* \*